Jan. 22, 1924.                                            1,481,659
                        J. L. ALLEN
                         SAW SET
                 Filed Dec. 18, 1922      3 Sheets-Sheet 1

Inventor
J. L. ALLEN
By
            Attorney

Jan. 22, 1924.
J. L. ALLEN
SAW SET
Filed Dec. 18, 1922      3 Sheets-Sheet 2
1,481,659
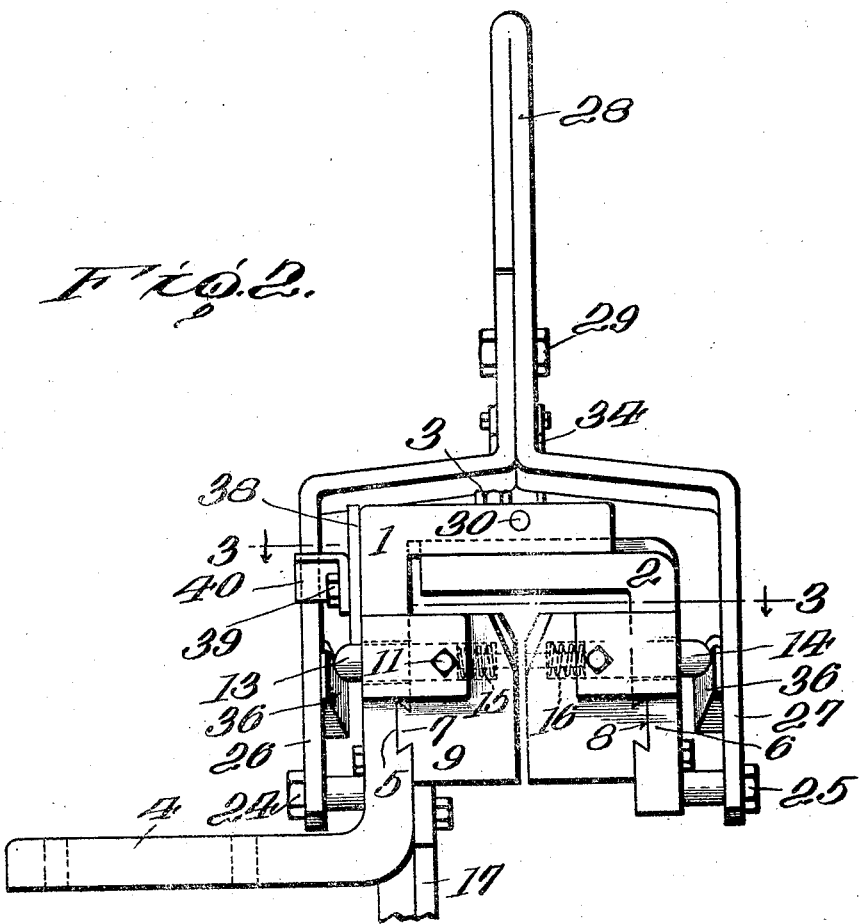
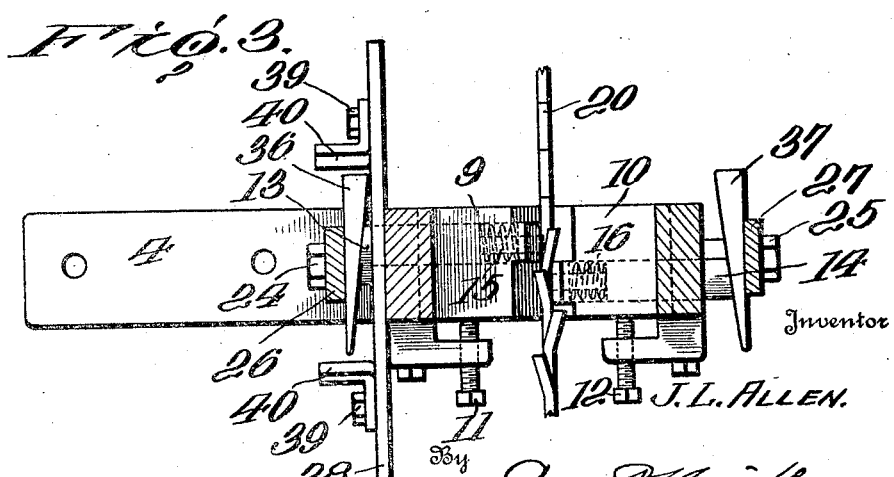
Inventor
J. L. Allen
By
Attorney

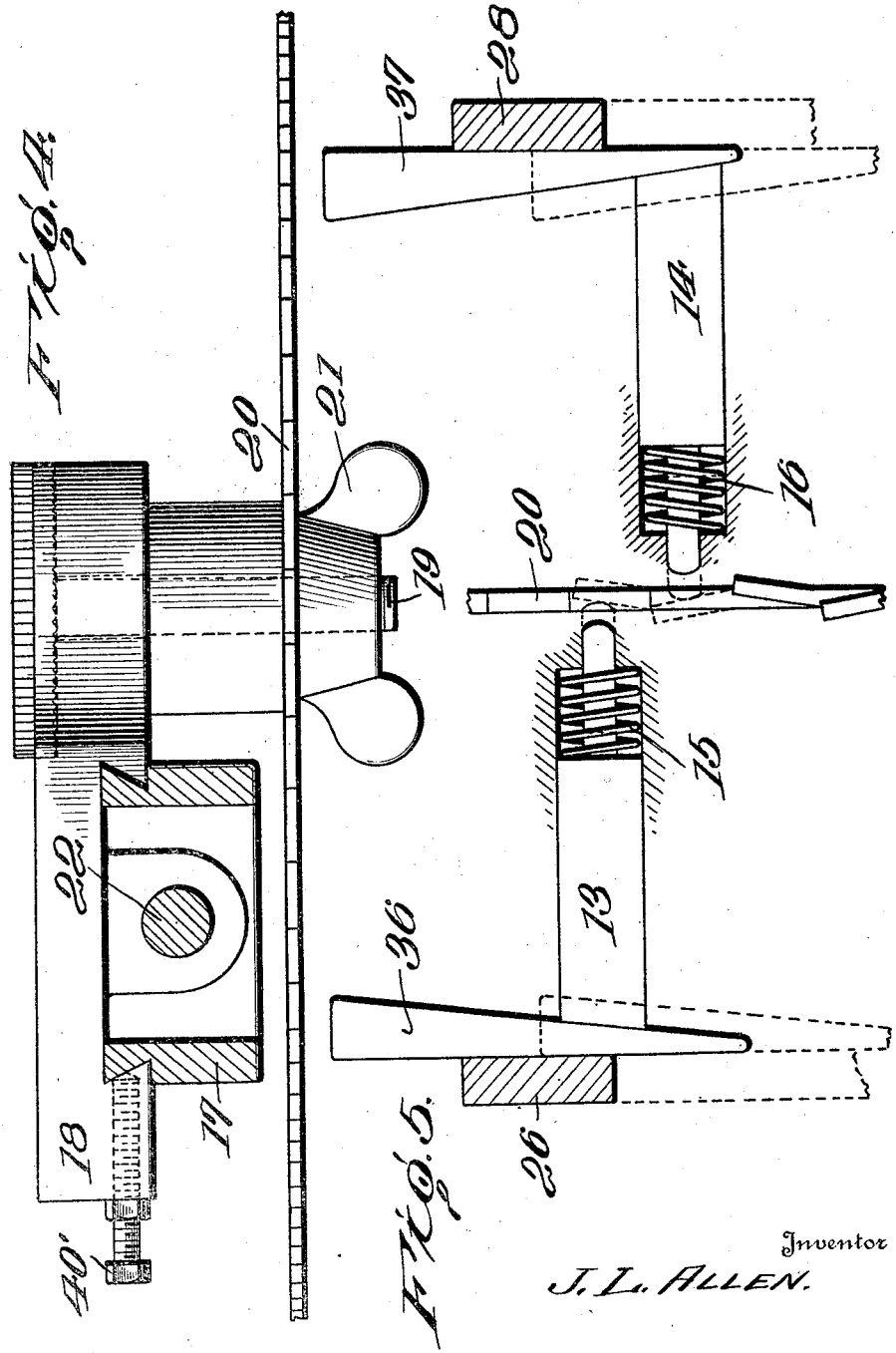

Patented Jan. 22, 1924.

1,481,659

UNITED STATES PATENT OFFICE.

JAMES L. ALLEN, OF MEMPHIS, TENNESSEE.

SAW SET.

Application filed December 18, 1922. Serial No. 607,590.

*To all whom it may concern:*

Be it known that I, JAMES L. ALLEN, a citizen of the United States, residing at Memphis, in the county of Shelby and State of Tennessee, have invented certain new and useful Improvements in Saw Sets, of which the following is a specification, reference being had therein to the accompanying drawing.

This invention relates to certain new and useful improvements in saw sets and more particularly to saw sets adapted for setting the teeth of circular saws, the object being to provide a set in which the movement of the operating lever will set two teeth when moved in one direction and when moved in the reverse direction will move the saw in position to have the succeeding pair of teeth in position to be operated on by the punches for setting the teeth.

Another and further object of the invention is to provide a saw set which is exceedingly simple and cheap in construction, the parts being so arranged and connected together that they can be readily assembled or taken apart.

A further object of the invention is to provide novel means for adjusting the movement of the setting punches for regulating the set of the teeth.

Another and still further object of the invention is to provide novel means for supporting and adjusting the position of the saw in respect to the setting punches whereby saws of various sizes can be set.

A still further object of the invention is to provide a saw set with adjustable anvils whereby the punches carried thereby can be properly positioned in respect to the teeth of the saw regardless of the design thereby enabling the set to operate on all styles of saws.

Other and further objects and advantages of the invention will be hereinafter set forth and the novel features thereof defined by the appended claims.

In the drawings,

Figure 2 is an inverted plan view;

Figure 3 is a section taken on line 3—3 of Figure 2;

Figure 4 is a detail view of the saw supporting carriage showing the manner of supporting the saw; and Figure 5 is an enlarged view showing the manner of operating the punches by the cams for setting the teeth of the saw.

Figure 1:
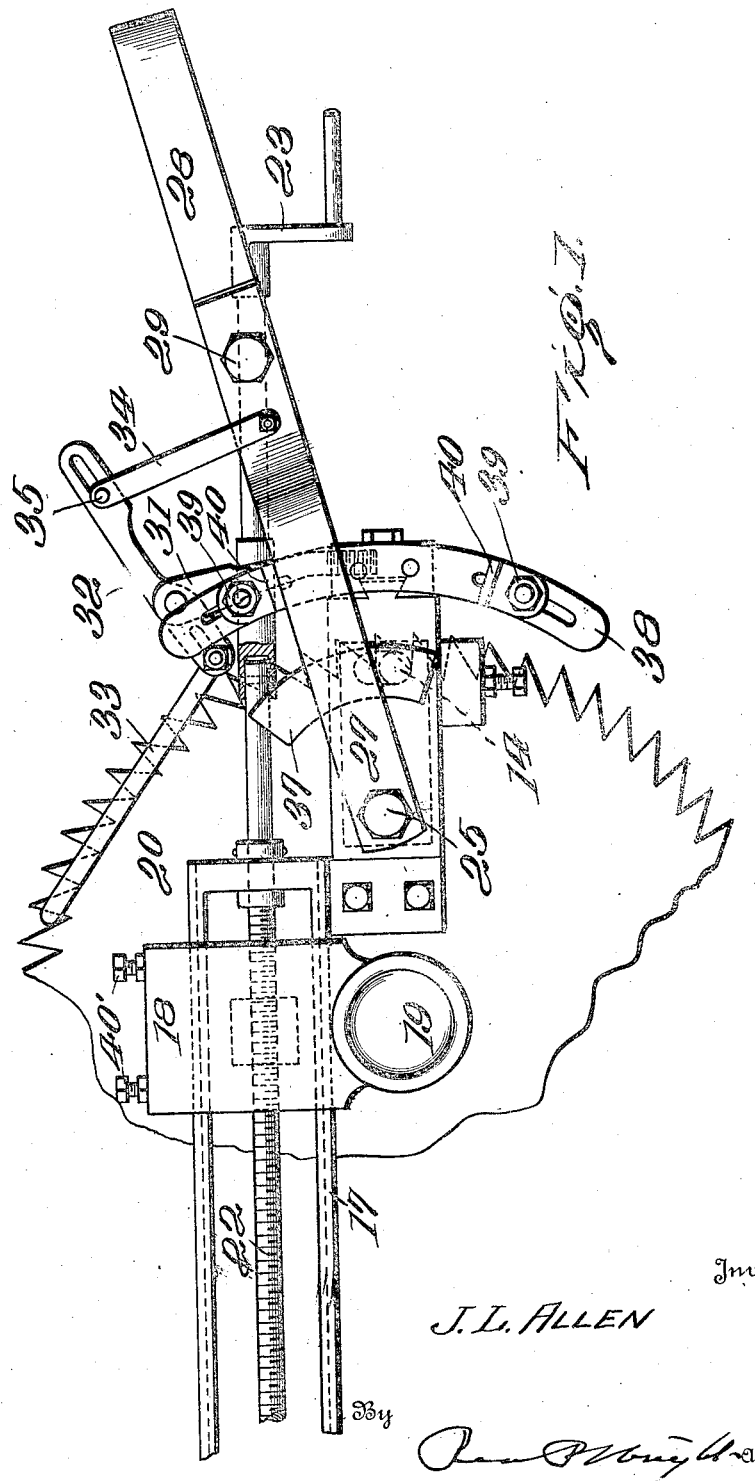
Figure 1 is a side elevation of a saw set constructed in accordance with my invention.

In the embodiment of my invention as herein shown, I employ an anvil frame formed of members 1 and 2 interlocked together by tongue and groove so as to form an adjustable frame which is secured in its adjusted position by a bolt 3, the member 1 being provided with an extension 4 for securing the same to a bench or support.

The inner walls of the members 1 and 2 are provided with dove-tailed grooves 5 and 6 in which are slidably mounted dove-tailed tongues 7 and 8 of anvils 9 and 10 which are adjustably mounted and secured in their adjusted position within said frame by set screws 11 and 12 as clearly shown in Figure 3, said anvils being spaced apart and adapted to receive a saw as will be later described.

The anvils are provided with punches 13 and 14 which extend outwardly through slots formed in the members 1 and 2, said punches being surrounded by springs 15 and 16 for holding the same in extended position out of the path of the saw when arranged between the anvils 9 and 10.

Secured to the member 1 of the anvil frame is a guide 17 on which is slidably mounted a carriage 18 having a saw supporting spindle 19 on which is adapted to be secured the circular saw 20 to be set by a wing nut 21, said carriage being provided with a threaded nut through which extends a feed screw 22 adapted to be operated by a crank 23 so as to adjust the saw between the anvils. By providing adjustable means for supporting the saw between the anvils, saws of various sizes can be positioned between the anvil for setting the teeth thereof.

The members 1 and 2 forming the anvil frame are provided with stud bolts 24 and 25 on which are pivotally mounted the arms 26 and 27 of a lever frame, said lever frame being provided with a handle portion 28. By constructing the lever in this manner, the arms 26 and 27 which are secured together by a bolt 29 can be separated so as to allow the same to be placed in position upon the stud bolts 24 and 25 upon which the lever is pivotally mounted.

Secured in a threaded opening 30 formed in the member 1 is a bifurcated stud bolt 31 in which is pivotally mounted an arm 32 having slotted ends as clearly shown in Figure 1. Mounted in one of the slotted ends of the arm 32 is a tooth-engaging member 33 which is provided with a hooked end adapted to extend between the teeth of the saw.

Secured to the handle portion of the lever are a pair of links 34 connected together by a pin 35 which is slidably mounted in the slotted end of the arm 32 so that when the lever is operated, the tooth-engaging member 33 will ride over the teeth and when the lever is operated in the reverse direction, the saw will be rotated so as to bring into position two additional teeth to be operated on by the punches 13 and 14.

The arms 26 and 27 of the lever are provided with cams 36 and 37 which are adapted to engage the ends of the punches 13 and 14 so as to force the punches inwardly against the tension of the springs in order to set the teeth of the saw when arranged between the anvils 9 and 10. In order to provide means for regulating the movement of the punches so as to determine the set of the teeth, I provide the anvil frame with means for limiting the swinging movement of the lever in the form of a curved plate 38 provided with slots in its end in which are mounted bolts 39 carrying stops 40 arranged in the path of travel of the operating lever and it will be seen that by adjusting these stops, the movement of the lever can be regulated so as to adjust the movement of the punches.

The movable carriage 18 is locked in its adjusted position after the saw carried thereby has been positioned between the anvils 9 and 10 by set screws 41 and the saw spindle carried by the carriage is so constructed that the saw is held thereon in such a manner that it can rotate in order to allow the teeth to be positioned between the anvils to be operated on by the punches when the lever is moved in one direction so as to bring the cams into engagement with the free ends of the punches. As the punches are moved inwardly, two of the teeth of the saw are operated on simultaneously so as to set the same. On the reverse movement of the lever, the saw is rotated on the spindle by the tooth-engaging feeding means so as to bring two additional teeth in position between the anvils to be operated on by the punches and it will be seen that after the saw has been placed in position and the anvils adjusted so as to position the punches properly in respect to the teeth of the saw, the swinging movement of the operating lever in one direction sets the teeth and in the reverse direction moves two additional teeth of the saw in position to be operated on when the lever is swung in a reverse direction.

From the foregoing description it will be seen that I have provided a saw set which is exceedingly simple and cheap and one in which the setting punches are operated by a movable lever which also operates the feeding means for rotating the saw to position the teeth in respect to the punch and I have found in practice that a saw set constructed in accordance with my invention will set the teeth of a saw very quickly and accurately.

What I claim is:—

1. A saw set comprising a frame, anvils carried by said frame provided with movable punches, a spindle for supporting a saw between said anvils, a forked lever having cams cooperating with said punches for forcing said punches into engagement with the teeth of said saw and means for limiting the movement of said lever.

2. A saw set comprising a frame having means for attaching the same to a support, a pair of anvils carried by said frame and spaced apart, a movable spring-returned punch mounted in each of said anvils, a guide carried by said frame, a carriage mounted on said guide having a saw supporting spindle, means for adjusting said carriage on said guide for positioning the saw between said anvils and a lever having arms pivotally mounted on said frame provided with cams cooperating with said punches for forcing said punches into engagement with the teeth of the saw in its movement in one direction.

3. A saw set comprising a frame having spaced anvils provided with punches, a lever having cams cooperating with said punches, means for supporting a saw between said anvils, a supporting stud carried by said frame, an arm pivotally mounted on said stud, a tooth engaging member carried by one end of said arm and a connection between the other end of said arm and said lever for causing said tooth engaging member to slide freely over the teeth of the saw on the movement of the lever in one direction and to engage the teeth of the saw on the movement of the lever in a reverse direction for rotating said saw on its supporting means.

4. A saw set comprising a frame formed of two members interlocked together, said members being provided with dove-tailed grooves, anvils provided with dove-tailed blocks slidably mounted in said grooves, means for locking said anvils in adjusted position, spring pressed punches mounted in said anvils and a lever having arms pivotally mounted upon said frame and provided with cams for forcing said punches inwardly.

5. A saw set comprising a frame having adjustable anvils spaced apart and between which the saw is adapted to be placed for setting the teeth thereof, a spring pressed punch mounted in each of said anvils, a lever having arms pivotally mounted on said frame, cams carried by the arms of said lever cooperating with said punches for moving said punches towards each other and feeding mechanism operated by said lever for moving the teeth of the saw set in position to be operated on by said punches.

6. A saw set comprising a frame having adjustably mounted anvils, sliding punches mounted in said anvils, a guide carried by said frame, a carriage slidably mounted on said guide provided with a saw supporting spindle, means for adjusting said carriage on said guide for positioning a saw between said anvils, a pivoted lever mounted on said frame having cams for engaging the punches of said anvils, when moved in one direction, and means operated by the movement of said lever in a reverse direction for moving the teeth of the saw in position to be operated on by said punches.

In testimony whereof I hereunto affix my signature.

JAMES L. ALLEN.